United States Patent [19]

Harris

[11] Patent Number: 4,816,529

[45] Date of Patent: * Mar. 28, 1989

[54] NOVEL ESTER-MODIFIED POLY(ALKYLENE CARBONATE) POLYAHLS AND POLYURETHANES THEREFROM

[75] Inventor: Robert F. Harris, Midland, Mich.

[73] Assignee: The Dow Chemical Company, Midland, Mich.

[*] Notice: The portion of the term of this patent subsequent to Aug. 11, 2004 has been disclaimed.

[21] Appl. No.: 931,498

[22] Filed: Nov. 17, 1986

Related U.S. Application Data

[63] Continuation-in-part of Ser. No. 799,211, Nov. 18, 1985, Pat. No. 4,686,273, and a continuation-in-part of Ser. No. 809,675, Dec. 16, 1985, Pat. No. 4,686,274.

[51] Int. Cl.$^4$ ............................................. C08F 283/02
[52] U.S. Cl. ................................... 525/453; 521/159; 525/452; 525/459; 525/460; 528/59; 528/61; 528/65; 528/76; 528/80; 558/276
[58] Field of Search ............... 528/59, 61, 65, 76, 528/80; 525/453, 459, 460, 452; 521/159; 558/276

[56] References Cited

U.S. PATENT DOCUMENTS

| | | | |
|---|---|---|---|
| 3,133,113 | 5/1964 | Malkemus | 260/463 |
| 3,248,414 | 4/1966 | Stevens | 260/463 |
| 3,324,070 | 6/1967 | Hostettler et al. | 260/32.2 |
| 3,379,693 | 4/1968 | Hostettler et al. | 260/77.5 |
| 3,567,763 | 3/1971 | Emmons | 260/478 |
| 4,105,641 | 8/1978 | Buysch et al. | 526/712 |
| 4,108,842 | 8/1978 | Konig et al. | 528/61 |
| 4,191,705 | 3/1980 | Lindner et al. | 260/463 |
| 4,267,120 | 5/1981 | Cuscurida et al. | 260/463 |
| 4,394,491 | 7/1983 | Hoffman | 525/452 |
| 4,435,527 | 3/1984 | Cuscurida | 521/173 |
| 4,476,293 | 10/1984 | Robinson | 528/76 |

OTHER PUBLICATIONS

W. Siefken, *Justus Liebigs Annalen der Chemie*, 562, 75–136.

Primary Examiner—Theodore E. Pertilla

[57] ABSTRACT

Ester-modified poly(alkylene carbonate) polyahls comprising the residues of at least one polyahl, polyalkyleneoxy moieties, poly(alkylene carbonate) moieties, the residues of at least one ester of a carboxylic acid, and a plurality of active hydrogen end group are disclosed. The ester-modified poly(alkylene carbonate) polyahl has a number average molecular weight higher than the number average molecular weight of any known poly(alkylene carbonate) polyahl comprising the same monomeric components. Also disclosed are isocyanate-functional prepolymers of these ester-modified poly(alkylene carbonate) polyahls formed by reactions of the ester-modified poly(alkylene carbonate) polyahls of this invention with excess organic polyisocyanates. Urethane/urea polymers formed by the reactions of the isocyanate-functional prepolymers with polyahls are also disclosed. Also disclosed are urethane/urea polymers comprising the residue of at least one ester-modified poly(alkylene carbonate) polyahl of this invention, the residue of a polyisocyanate and the residue of at least one other polyahl selected from the group consisting of polyamines, polymercaptans and polyfunctional hydroxyl compounds. The novel compositions of this invention are useful in urethane/urea polymer applications such as foams, elastomers, plastics, adhesives, coatings and the like.

31 Claims, 1 Drawing Sheet

NOVEL ESTER-MODIFIED POLY(ALKYLENE CARBONATE) POLYAHLS AND POLYURETHANES THEREFROM

CROSS-REFERENCE TO RELATED APPLICATIONS

This application is a continuation-in-part of U.S. patent applications Ser. No. 799,211 filed on Nov. 18, 1985 U.S. Pat. No. 4,686,273 and Ser. No. 809,675 filed on Dec. 16, 1985 U.S. Pat. No. 4,686,274; and is a related application to U.S. patent applications Ser. No. 750,362 filed on July 1, 1985; Ser. No. 850,788 filed on Apr. 11, 1986 and also, copending patent application Ser. No. 931,597, filed Nov. 17, 1986.

DESCRIPTION OF THE BACKGROUND

Polyether polyols and polyester polyols are well-known polymers which can be further polymerized with organic polyisocyanates to prepare polyurethanes. Polyether polyols are prepared by the reaction of hydroxy-containing hydrocarbons, such as an aromatic or aliphatic diol or triol, and epoxides, e.g., ethylene oxide and propylene oxide. Polyester polyols are prepared by the reaction of polyacids, such as dimethyl adipate or dimethyl terephthalate with dihydroxy-containing hydrocarbons, such as aromatic and aliphatic diols and triols. Some poly(alkylene carbonate) polyol properties resemble polyester polyol properties while other properties resemble polyether polyols.

It is known to prepare polycarbonates from aliphatic dihydroxyl compounds either by a process of phosgenation in which hydrogen chloride is liberated or bound by bases, such as pyridine or quinoline, or by a process of transesterification with carbonic acid esters of alcohols or phenols, preferably diphenyl carbonate, optionally with the aid of transesterification catalysts. In either case, it is essential to use phosgene or a mixture of carbon monoxide and chlorine as the source of carbonic acid. Technical processes which involve the preparation and handling of phosgene are difficult and costly on account of considerable safety risks involved and the high cost of materials due to corrosion. To this are added ecological problems since either the spent air is contaminated with hydrogen chloride or the effluent water is contaminated with sodium chloride.

Polycarbonates produced by these methods, using dihydrocarbyl compounds, may have a functionality of less than two due to inadequate or incomplete esterification or transesterification which often prevents the products forming high molecular weight polymers in subsequent reactions.

U.S. Pat. Nos. 3,248,414; 3,248,415 and 3,248,416 to Stevens disclosed the preparation of poly(alkylene carbonate) polyols from (1) carbon dioxide and 1,2-epoxides;
(2) cyclic carbonates such as ethylene carbonate; or
(3) cyclic carbonates and a 1,2-epoxide.

A minor amount of a polyol is employed therein as an initiator. The reaction is usually conducted in the presence of a metal carbonate, metal hydroxide, trisodium phosphate or tertiary amine.

Poly(alkylene carbonate) polyols have also been prepared by polymerization of ethylene carbonates under pressure using basic catalysts and a minor amount of glycol as initiator as disclosed in U.S. Pat. No. 4,105,641 to Buysch et al. These products are low in carbonate and high in ether group concentration due to decomposition of the ethylene carbonate. In the Stevens' patents discussed hereinbefore, a poly(alkylene carbonate) polyol derived from ethylene carbonate and monoethylene glycol was exposed to temperatures of 160° C. at 2 mm Hg of pressure to remove unreacted ethylene carbonate. In U.S. Pat. No. 3,379,693, Hostetler removed unreacted ethylene carbonate from products similar to poly(alkylene carbonate) polyols by heating to about 130° C. under a pressure of 1–5 mm Hg. In U.S. Pat. No. 3,896,090 to Maximovich, ethylene carbonate was reacted with diethylene glycol and the reaction product treated under reduced pressure to remove the unreacted ethylene carbonate and diethylene glycol.

Several workers have prepared poly(alkylene carbonate) polyols and related materials by controlling the equilibrium between the reaction materials of a diol and alkylene carbonate and the products of a poly(alkylene carbonate) polyol and monoethylene glycol. The reaction is controlled by the removal of monoethylene glycol.

In U.S. Pat. No. 3,133,113 to Malkemus, ethylene carbonate and diethylene glycol were reacted at 125° C. to 180° C. under a reduced pressure of 100 mm Hg in the presence of certain catalysts with concurrent removal of monoethylene glycol as a distillate. The catalyst employed was a mixed zinc borate-alkaline earth metal oxide catalyst. This was followed by removal of starting material. The Malkemus procedure is plagued by the presence of volatile ethylene carbonate which condenses as a solid throughout the system causing severe plugging and reducing ethylene carbonate conversion while monoethylene glycol is being removed. This process requires large excesses of ethylene carbonate.

In U.S. Pat. No. 3,313,782 to Springmann et al., this process was further studied under reduced pressure in the presence of catalysts, and limits on the reaction conditions were set. The reaction temperatures must be lower in this process than the boiling point of the alkylene carbonate, but still high enough to distill off the monoethylene glycol formed.

U.S. Pat. No. 4,131,731 to Lai et al. used stage reductions in pressure during the reaction of alkylene carbonate with a diol. The final stage of the Lai et al. process is intended to remove monoethylene glycol. The patentees characterized their reaction conditions by stating that the alkylene carbonate must have a boiling point 4.9° C. greater than monoethylene glycol. The chemistry based on the above equilibrium was improved upon by U.S. Pat. No. 4,105,641 to Buysch et al. where the reaction were carried out in a solvent (e.g., cumene) capable of removing monoethylene glycol as an azeotrope with the solvent.

Polyester-carbonates have been made by several workers with various structural and processing variations. See, for example, U.S. Pat. Nos. 3,030,331; 3,220,976; 3,441,141; 3,449,467; 3,549,682 and 4,191,705.

Hydroxyl-terminated polyester-carbonates have been prepared from lactones and cyclic carbonate compounds. U.S. Pat. No. 3,301,824 discloses the copolymerization of cyclic carbonates containing at least six atoms in the ring nucleus with at least one lactone. U.S. Pat. Nos. 3,324,070 and 3,379,693 describe different catalysts to produce polyester-carbonates. Somewhat different polyester-carbonate diol structures were prepared in U.S. Pat. No. 4,503,216 to Fagerburg et al.

In U.S. Pat. No. 3,449,467, Wynstra et al. used dibasic acids or cyclic acid anhydrides to produce polyester-carbonates. In U.S. Pat. No. 4,267,120, Cuscurida et al. prepared polyester-carbonates using certain cyclic acid anhydrides.

Certain polyester-carbonates have been used in polyurethanes (see, for example, U.S. Pat. No. 4,435,527 by Cuscurida).

Heretofore, the molecular weights of poly(alkylene carbonate) polyols from alkylene carbonates have been controlled by either the stoichiometry of the reactants, that is, higher alkylene carbonate to initiator ratios for higher molecular weights, or the removal of monoethylene glycol from the reaction mixture with an ethylene carbonate to initiator equivalent ratio of about 1. Catalysts are used in most cases since reaction rates are very slow in the absence of a catalyst. When high alkylene carbonate to initiator ratios are used to make higher molecular weight poly(alkylene carbonate) polyols, reaction rates drop severely as higher conversions are approached. In these cases, long reaction times are required and the products are contaminated by unreacted alkylene carbonate. If temperatures are increased to increase the rate, product decomposition occurs with $CO_2$ loss.

The same trend occurs with the polyester-carbonates that have been reported. Molecular weight is controlled by the stoichiometry of the reactants. Catalysts are used in most cases. Product decomposition with loss of carbon dioxide is always a serious side reaction.

In view of the deficiencies of the conventional poly(alkylene carbonate) polyahls, it would be highly desirable to provide poly(alkylene carbonate) polyahls having improved physical and chemical properties.

SUMMARY OF THE INVENTION

In one aspect, this invention is a new, ester-modified poly(alkylene carbonate) polyahl comprising
(1) a backbone comprising;
  (a) the residue of at least one polyahl initiator;
  (b) a plurality of poly(alkyleneoxy) moieties; and
  (c) a plurality of poly(alkylene carbonate) moieties;
(2) a plurality of active hydrogen end groups; and
(3) the residue of at least one modifier which resides in the polymer backbone and/or is present as an end group; wherein the ester modifier is selected from the group consisting of
  (a) polyester polyahls;
  (b) polyacids;
  (c) acid esters of polyacids and $C_{1-8}$ monofunctional alcohols; and
  (d) cyclic acid anhydrides;
said ester-modified poly(alkylene carbonate) polyahls having a number average molecular weight higher than the number average molecular weight of any known poly(alkylene carbonate) polyahl comprising the same monomeric components. These ester-modified poly(alkylene carbonate) polyahls contain at least about 5 weight percent carbon dioxide and at least about 5 weight percent modifier.

In a second aspect, this invention includes isocyanate-functional prepolymer compositions of these ester-modified poly(alkylene carbonate) polyahls formed by reaction of the ester-modified poly(alkylene carbonate) polyahls with excess polyisocyanates.

In a third aspect, this invention includes novel urethane/urea polymers formed by the reactions of these isocyanate-functional prepolymer compositions with polyahls.

In a fourth aspect, this invention includes novel urethane/urea polymers formed by the reactions of the novel, ester-modified poly(alkylene carbonate) polyahls of this invention with polyisocyanates, optionally in the presence of other polyahls.

The introduction of an ester modifier into the backbone of the poly(alkylene carbonate) polyahl allows adjustment of the physical and chemical properties of the poly(alkylene carbonate) polyahl to maximize its effectiveness in specific applications. For example, the ester-modified polyahls of this invention are useful for producing materials for applications in flexible urethane foams, urethane coatings, rigid urethane foams, urethane/urea elastomers and plastics, adhesives, functional fluids, polymeric coatings and surfactants among others.

BRIEF DESCRIPTION OF THE DRAWING

The drawing as illustrated by FIG. 1 shows the effect for differing amounts of two different initiators diethylene glycol adipate and poly(caprolactone) diol—on molecular weight of the resultant polymer.

DETAILED DESCRIPTION OF THE INVENTION

Figure 1:
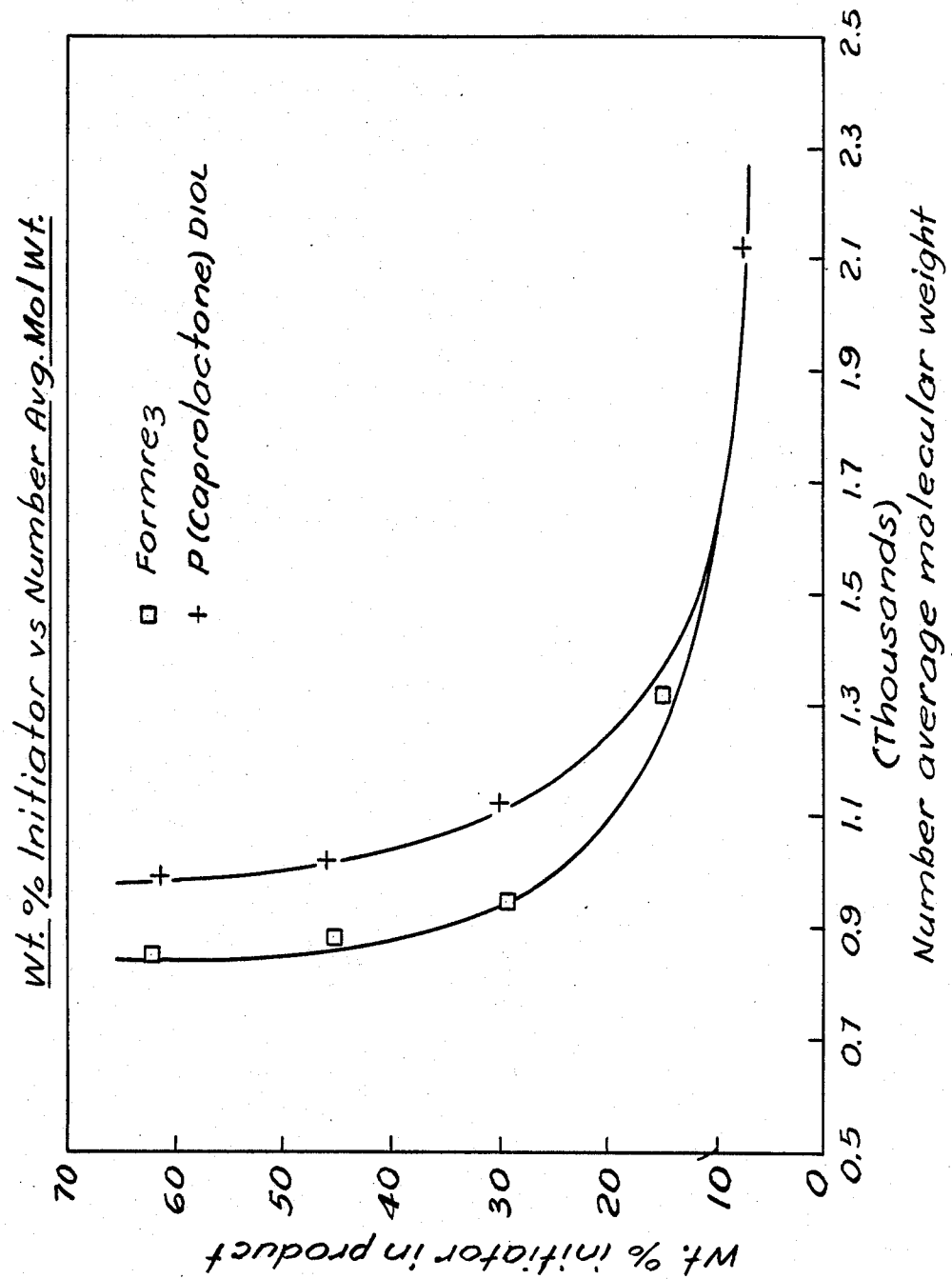

The ester-modified poly(alkylene carbonate) polyahl compositions of this invention can be prepared by the reactions of poly(alkylene carbonate) polyahls with one or more modifiers. During these reactions the modifier is chemically combined to the poly(alkylene carbonate) polyahl.

Poly(alkylene carbonate) polyahls are randomized polymers having a plurality of carbonate moieties and a plurality of active hydrogen moieties and optionally other moieties such as di- and higher polyalkyleneoxy, units. An alkylene carbonate moiety is a repeating unit which has an alkylene group bound to a carbonate moiety. An active hydrogen moiety is a moiety containing a hydrogen atom which because of its position in the moiety displays significant activity according to the Zerewitnoff test described by Kohler et al. in the *Journal of American Chemical Society*, 49, 3181 (1927). Illustrative of such active hydrogen moieties are —COOH, —OH, —NH$_2$, —NH—, —CONH$_2$, —SH and —CONH—. Alkyleneoxy moiety refers herein to a repeating unit which has an alkylene group bound to oxygen. Alkylene carbonate and alkyleneoxy moieties are respectively represented by the following formulae:

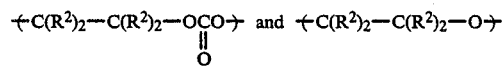

wherein $R^2$ is as hereinafter defined.

Preferred poly(alkylene carbonate) polyahls are random polymers which correspond to the formula

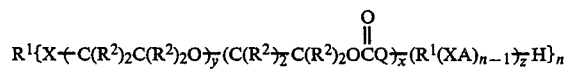

wherein
$R^1$ is separately in each occurrence an n-valent hydrocarbon radical or hydrocarbon radical which can contain one or more heteroatoms of O, N or S;

$R^2$ is separately in each occurrence hydrogen, halogen, a nitro group, a cyano group, a $C_{1-20}$ hydrocarbyl group or a $C_{1-20}$ hydrocarbyl group substituted with one or more halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

X is separately in each occurrence S, O, NH,

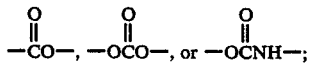

A is separately in each occurrence

combinations thereof or a covalent bond;

Q is separately in each occurrence O, S or NH provided that all carbonate moieties are internal because terminal carbonate moieties are unstable and form OH moieties by the elimination of $CO_2$;

n is separately in each occurrence an integer of from 1 to 25;

x is separately in each occurrence an integer of from 1 to 40;

y is separately in each occurrence an integer of from 1 to 120; and z is separately in each occurrence an integer of from 0 to 5.

A more preferred class are poly(alkylene carbonate) polyols generally corresponding to the aforementioned formula wherein $R^1$, $R^2$ and n are as previously defined wherein X is oxygen, x is separately in each occurrence an integer from 2 to 10;

y is separately in each occurrence an integer from 5 to 15; and z is an integer from 0 to 2, provided that the ratio of y to x is from 1:1 to 3:1.

Preferred amongst the above are modified poly(alkylene carbonate) polyols of the invention wherein $R^1$ is hydrogen, $C_{1-20}$ alkyl, $C_{1-20}$ haloalkyl, $C_{1-20}$ alkenyl or phenyl;

X is S, O, or NH; and n is an integer from 1 to 10.

Further preferred random polyol residues of the invention are those wherein $R^1$ is an n-valent alkane or cycloalkane, or an n-valent alkane or cycloalkane containing one or more oxygen, nitrogen or sulfur moieties;

$R^2$ is hydrogen, methyl or ethyl moieties;

X is O; and n is an integer from 1 to 5.

Still more preferred are the polyol residues wherein $R^1$ is n-valent $C_{1-20}$ alkane or an n-valent $C_{1-10}$ alkane substituted with one or more oxygen moieties;

$R^2$ is hydrogen or methyl; and n is 1 or 2. The most preferred of the polyol residues is wherein $R^2$ is hydrogen.

Poly(alkylene carbonate) polyahl starting materials useful in this invention are prepared by any method known in the art, such as the condensation of an alkylene carbonate, carbon dioxide and an alkylene oxide, or mixtures of an alkylene carbonate, an alkylene oxide and/or $CO_2$, with an organic compound containing one or more active hydrogen atoms (initiator) in the presence of an alkaline catalysts or metal salt of an alkaline compound. Examples of these poly(alkylene carbonate) polyols and methods for preparation of these polyols are contained in Maximovich (U.S. Pat. Nos. 3,896,090 and 3,689,462). Springmann (U.S. Pat. No. 3,313,782), Stevens (U.S. Pat. Nos. 3,248,416; 3,248,415 and 3,248,414) and copending application Ser. No. 750,362, all incorporated herein by reference. Alternatively, the poly(alkylene carbonate) polyols can be prepared by reacting a dialkyl carbonate or diaryl with an initiator with two or more hydroxyl moieties. See, for example, U.S. Pat. No. 4,476,293 and U.S. Pat. No. 4,191,705, incorporated herein by reference.

The poly(alkylene carbonate) polyahls used as starting materials also contain the residue of an initiator and may as well also contain unreacted starting materials and other relatively volatile reaction products.

A preferred process for producing poly(alkylene carbonate) polyol starting materials is taught in U.S. Ser. No. 750,362 filed July 1, 1985, which is hereby incorporated by reference in its entirety.

The organic compounds which function suitably as modifiers in the practice of this invention are polyfunctional materials which are reactive with the carbonate and/or active hydrogen moieties of poly(alkylene carbonate) polyahls.

Most polyahls which are suitable as modifiers are reactive with the carbonate moieties of poly(alkylene carbonate) polyahls. Typical polyahls include polyols, polyamines, polyamides, polymercaptans and polyacids.

Preferred modifiers for use in the present invention are polyahls containing carboxylic acid ester moieties and materials which react with polyols to form carboxylic acid ester moieties. Of the foregoing polyahls, the polyols are preferred.

Polyester polyols are a preferred class of polyols containing carboxylic acid ester moieties in their backbone. Examples of polyester polyols include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, brassylic acid, thapsis acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol including both aliphatic and aromatic may be used such as ethylene glycol, diethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methylglucoside, pentaerythritol and sorbitol. Also included with the term "polyhydric alcohol" are compounds derived from phenols such as 2,2-(4,4'-hydroxyphenyl)propane, commonly known as bisphenol A, bis(4,4'-hydroxyphenyl)sulfide and bis(4,4-hydroxyphenyl)sulfone.

Polyahls containing two or more functional groups are also operative modifiers in this process. These include amino acids such as 6-amino caproic acid, 12-amino-dodecanoic acid, p-aminophenylacetic acid, 11-amino-undecanoic acid, 5-aminovaleic acid and the like. Also included are hydroxy acids, mercapto acids and the like.

Some polyahls suitable as modifiers are also reactive with the active hydrogen moieties of poly(alkylene carbonate) polyahls. Polyacids such as aromatic and aliphatic polycarboxylic acids, polysulfonic and sulfinic acids, polyphosphonic and polyphosphinic acids are in this class of compounds. Polymers and copolymers containing acid-functional moieties are also operable. Other polyahls suitable as modifiers are described in U.S. Pat. No. 4,460,715.

The modifier can also be materials other than polyahls which are reactive with the active hydrogen moieties of poly(alkylene carbonate) polyahls. The cyclic anhydrides are one class of such materials. Examples include succinic anhydride, maleic anhydride, phthalic anhydride, bromomaleic anhydride, dichloromaleic anhydride, dimethylmaleic anhydride, dimethylsuccinic anhydride, 2-dodecen-1-yl succinic anhydride, glutaric anhydride, heptanoic anhydride, hexanoic anhydride, homophthalic anhydride, 3-methylglutaric anhydride, methylsuccinic anhydride, 2-phenylglutaric anhydride, pyromellitic dianhydride and the like. Cyclic anhydrises can contain other functional groups which are reactive with poly(alkylene carbonate) polyahls such as hydroxyl and carboxylic acid groups.

Another class of modifiers that are reactive with the active hydrogen moieties of poly(alkylene carbonate) polyahls are polyesters. Preferred polyesters are those formed from the lower alcohols of polycarboxylic acids. Examples include the esters from alcohols containing 1 to 8 carbon atoms with polyfunctional acids such as malonic acid, succinic acid, glutaric acid, adipic acid, pimelic acid, suberic acid, azelaic acid, maleic acid, fumaric acid, terephthalic acid, isophthalic acid, 1,4-cyclohexane dicarboxylic acid and the like. Also suitable are esters of polysulfonic, polysulfinic, polyphosphinic and polyphosphonic acids. The only requirement is that the alcoholic portion of the polyester is volatile under the conditions of the instant process.

In one process, the ester-modified poly(alkylene carbonate) polyahls of this invention can be obtained by reacting at least one poly(alkylene carbonate) polyahl with a modifier to form a modified poly(alkylene carbonate) polyahl having an increased molecular weight, and removing at least one gaseous compound other than a monoalkylene glycol from said reaction, said gaseous compound being at least as volatile as a tetraethylene glycol and said modifier (1) having a plurality of moieties that are reactive with the carbonate and/or active hydrogen moieties of the poly(alkylene carbonate) polyahl and (2) being about as volatile or less volatile than the major gaseous compound removed. This process is described in detail in U.S. Ser. No. 799,211 filed on Nov. 18, 1985, now U.S. Pat No. 4,686,273, which is hereby incorporated by reference in its entirety.

In a second process, the ester-modified poly(alkylene carbonate) polyahls of this invention can be prepared by contacting at least one poly(alkylene carbonate) polyahl with at least one modifier containing two or more active hydrogen moieties, optionally in the presence of a catalytic amount of a catalyst for the reaction of an active moiety of the poly(alkylene carbonate) polyahl with a reactive moiety of the modifier under conditions sufficient to cause reaction between said active moiety of said poly(alkylene carbonate) polyahl and said reactive moiety of said modifier to form a modified poly(alkylene carbonate) polyahl wherein the modifier is chemically bonded to the poly(alkylene carbonate) polyahl backbone. This process is described in detail in U.S. patent application Ser. No. 809,675 filed on Dec. 16, 1985, now U.S. Pat. No. 4,686,274, which is hereby incorporated in its entirety.

A preferred class of ester-modified poly(alkylene carbonate) polyahl compositions of this invention are random polymers which correspond to the formula

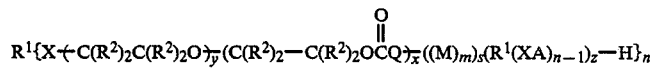

wherein $R^1$, $R^2$, X, A, Q, n, x, y and z are as previously defined;

M is separately in each occurrence the residue of a polyester polyahl or the residue of a polycarboxylic acid;

m is separately in each occurrence an integer of from 1 to 40 when M is the residue of a polyester polyahl and m is 1 when M is the residue of a polycarboxylic acid; and s is separately in each occurrence an integer of from 1 to 10.

A more preferred class is random, ester-modified poly(alkylene carbonate) polyols generally corresponding to the aforementioned formula wherein $R^1$, $R^2$ and n are as previously defined wherein X is oxygen, x is separately in each occurrence an integer from 2 to 10;

y is separately in each occurrence an integer from 5 to 15; and z is an intger from 0 to 2, provided that the ratio of y to x is from 1:1 to 3:1.

Preferred amongst the above are modified poly(alkylene carbonate) polyols of the invention wherein $R^1$ is hydrogen, $C_{1-20}$ alkyl, $C_{1-20}$ haloalkyl, $C_{1-20}$ alkenyl or phenyl;

X is S, O, or NH;

n is separately in each occurrence an integer of from 1 to 10; and m is separately in each occurrence an integer of from 1 to 20 when M is the residue of a polyester polyahl and m is 1 when M is the residue of a polycarboxylic acid.

Further preferred random, ester-modified poly(alkylene carbonate) polyols of this invention are those wherein $R^1$ is an n-valent alkane or cycloalkane, or an n-valent alkane or cycloalkane containing one or more oxygen, nitrogen, or sulfur moieties;

$R^2$ is hydrogen, methyl or ethyl;

X is O;

M is the residue of a polyester polyahl;

n is an integer of from 1 to 5; and s is an integer of from 1 to 5.

Still more preferred are the ester-modified poly(alkylene carbonate) polyols wherein $R^1$ is n-valent $C_{1-20}$ alkane or an n-valent $C_{1-10}$ alkane substituted with one or more oxygen moieties;

$R^2$ is hydrogen or methyl; and m is an integer from 1 to 10; and n is 1 or 2;

x is 1;

y is separately in each occurrence 1 to 40; and z is separately in each occurrence 1 to 100.

A still more preferred group of random ester-modified poly(alkylene carbonate) polyols is that corresponding to the above formula and wherein $R^2$ is hydrogen, $C_{1-20}$ alkyl, $C_{1-20}$ haloalkyl, $C_{1-20}$ alkenyl, or phenyl;

$R^3$ is an aliphatic or cycloaliphatic hydrocarbon or an aliphatic or cycloaliphatic hydrocarbon containing one or more oxygen, sulfur or nitrogen moieties;

M is the residue of a polyester polyol;

X is S, O, or NH;

m is an integer of 1 to 20, inclusive;

n is an integer of 1 to 10, inclusive;

p is 1 to 10, inclusive;

y is 5 to 20, inclusive; and z is 20 to 50, inclusive.

An even more preferred group of random ester-modified poly(alkylene carbonate) polyols corresponding to the above formula is that wherein $R^2$ is hydrogen, $C_{1-3}$ alkyl, $C_{2-3}$ alkenyl or phenyl;

$R^3$ is an n-valent alkane or cycloalkane or an n-valent alkane or cycloalkane containing an oxygen, sulfur or nitrogen moieties;

m is an integer of 1 to 10, inclusive;

n is an integer of 1 to 5, inclusive;

p is 1 to 5, inclusive; and s is an integer of from 1 to 5.

A yet more preferred group of random ester-modified poly(alkylene carbonate) polyols is that corresponding to the above formula and wherein $R^2$ is hydrogen, methyl or ethyl;

$R^3$ is an n-valent $C_{1-10}$ alkane; and n is 1 or 2.

The most preferred of the ester-modified poly(alkylene carbonate) polyols is wherein $R^2$ is hydrogen.

Another preferred group of ester-modified poly(alkylene carbonate) polyols of the invention are those random polymers which correspond to the formula

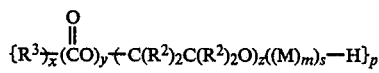

wherein $R^2$, M, m, n and s are as previously defined;

$R^3$ is $R^4$—$X^1$n;

$R^4$ is separately in each occurrence an n-valent hydrogen radical or hydrocarbon radical which contains one or more heteroatoms of O, N or S;

$X^1$ is O, S or NH; and p is separately in each occurrence an integer of one or greater.

The novel, ester-modified poly(alkylene carbonate) polyahl compositions of this invention contain several key components in their backbones. The residue of at least one polyahal initiator is present, typically, as the result of the particular initiator employed to make the starting material, the poly(alkylene carbonate) polyahl.

The poly(alkeneoxy) moieties and the poly(alkylene carbonate) moieties are also present in the backbone of the poly(alkylene carbonate) polyahl starting material.

The plurality of active hydrogen end groups present in the ester-modified poly(alkylene carbonate) polyahls are in part due to the end groups resulting from reaction of the modifier with the poly(alkylene carbonate) polyahl, in part from the end groups of the poly(alkylene carbonate) polyahl and in part from end groups present on the modifier. If all end groups on the modifier react into the polymer backbone, then none of the modifier end groups will be present as end groups in the product. On the other hand, if some end groups on the modifier remain unreacted after incorporation of the modifier into the polymer backbone, then the resultant polymer will have some end groups derived from the modifier.

Reaction is thought to occur mainly between an active hydrogen moiety on the modifier and a carbonate moiety on the poly(alkylene carbonate) polyahl. Such reaction occurs, in general, without loss of carbon dioxide content in the polymer backbone. If residual catalyst is present and at higher temperatures, some loss of carbon dioxide content can occur. When the modifiers are cyclic anhydrides, polycarboxylic acids or carboxylic acid esters of polycarboxylic acids and $C_{1-8}$ monofunctional alcohols, reaction is thought to occur mainly between an active hydrogen moiety on the poly(alkylene carbonate) polyahl and a carbonyl moiety on the modifier.

Molecular weight of an ester-modified poly(alkylene carbonate) polyahl product is controlled by the reaction conditions used and by the type and quantity of the modifier used. Under the conditions used in the prior art, molecular weights have been controlled by the stoichiometry of the reactants. Initiators have been used to build molecular weight by reaction with materials such as aryl carbonates, alkyl carbonates, cyclic carbonates and alkylene oxides and carbon dioxide. The molecular weight of the poly(alkylene carbonate) polyahl and the weight percent initiator in the polymer backbone are interdependent using prior art processes. As larger amounts of a given initiator are employed, the molecular weight of the resultant polymer decreases. This is due to the larger proportion of chain ends present at higher initiator levels.

FIG. 1 illustrates this effect for differing amounts of two different initiators—diethylene glycol adipate (molecular weight=500) and poly(caprolactone) diol (molecular weight=530). A plot of weight percent initiator versus number average molecular weight with these two different initiators shows the general effect that as initiator levels are increased, molecular weight is decreased.

Due to this interdependence of weight percent initiator on molecular weight, prior to the present invention, it has not been possible to make materials with both high initiator levels and high molecular weights. Initiators and modifiers can be the same materials chemically, but have different names due to their different functions in a particular process. An initiator is used to initiate reaction between monomers to produce polymeric materials. A modifier is used to react with a polymer to change its backbone composition.

In the current invention, all compositions above and to the right of a given weight percent initiator versus molecular weight curve (as illustrated) in FIG. 1) are novel compositions of matter. The relationship between the weight percent initiator and the molecular weight is dependent on the molecular weight of the initiator and its functionality. For example, one data point on the diethylene glycol adipate curve represents a composition containing 45.3 weight percent diethylene glycol adipate in the backbone of a poly(ethylene carbonate) polyol with a $\overline{M}n$ of 881. If one attempts to increase the diethylene glycol adipate content, the result is lower molecular weight material. However, compositions with 45.3 weight percent diethylene glycol adipate can take on any molecular weight greater than 881 and become novel compositions of this invention. This is made possible by the novel processes of U.S. application Ser. Nos. 799,211 and 809,675 as described hereinbefore.

The amount of modifier in the ester-modified poly(alkylene carbonate) polyahl compositions can vary over a wide range so long as it is sufficient to produce the desired increase in molecular weight. A preferred range of modifier is from about 5 to about 80 weight percent modifier based on the weight of the modified poly(alkylene carbonate) polyahl product; a more preferred range is from about 7 to about 65 weight percent modifier; and a most preferred range is from about 10 to about 50 weight percent modifier.

The carbon dioxide content of the ester-modified poly(alkylene carbonate) polyahl compositions can vary over a wide range to provide the desired propety improvements. A preferred range of carbon dioxide contents is from about 5 to about 30 weight percent carbon dioxide based on the weight of the modified poly(alkylene carbonate) polyahal product; a more preferred range is from about 7 to about 25 weight percent carbon dioxide; and a most preferred range is from about 10 to about 22 weight percent carbon dioxide.

The molecular weight of the ester-modified poly(alkylene carbonate) polyahl product can vary over a wide range. Preferred moelcular weights ($\overline{M}n$) are between about 500 and about 20,000; a more preferred range is from 800 to 10,000 and the most preferred range is from 1,000 to 8,000 with the proviso that the molecular weight is higher than any known poly(alkylene carbonate) polyahl containing at least the same weight percent modifier and the same amount of poly(alkylene carbonate) and poly(alkylenoxy) residues.

In a second aspect, this invention includes isocyanate-functional prepolymer compositions of the novel ester-modified poly(alkylene carbonate) polyol compositions of this invention formed by the reactions of these ester-modified poly(alkylene carbonate) polyols with excess polyisocyanates.

The polyisocyanates suitable for these reactions include aliphatic, cycloaliphatic, arylaliphatic, aromatic and heterocyclic polyisocyanates. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato-3,3,5-trimethyl-5-isocyanato methyl cyclohexane, (see, e.g., German Auslegeschrift No. 1,202,785); 2,4- and 2,6-hexahydrotolylene diisocyanate and mixtures of these isomers, hexahydro-1,3- and/or 1,4-phenylene diisocyanate, perhydro-2,5'- and/or 4,4'-diphenyl methane diisocyanate 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4''-triisocyanate, polyphenol polymethylene polyisocyanates of the type obtained by condensing aniline with formaldehyde, followed by phosgenation and such as described, for example, in British Pat. Nos. 874,430 and 848,671, perchlorinated aryl polyisocyanates of the type described in German Auslegeschrift No. 1,157,601, polyisocyanates containing carbodiimide groups of the type described in German Pat. No. 1,092,007, diisocyanates of the type described in U.S. Pat. No. 3,492,330, polyisocyanates containing allophanate groups of the type described, for example, in British Pat. No. 994,890, in Belgian Pat. No. 761,626 and in published Dutch Patent Application No. 7,102,524 polyisocyanates containing isocyanurate groups of the type described in German Pat. Nos. 1,022,789; 1,222,067 and 1,027,394 and in German Offenlegungsschrift No. 1,929,034 and 2,004,048, polyisocyanates containing urethane groups of the type described, for example, in Belgian Pat. No. 752,261 or in U.S. Pat. No. 3,394,164, polyisocyanates containing acrylated urea groups as described in German Pat. No. 1,230,778, polyisocyanates containing biuret groups of the type described, for example, in German Pat. No. 1,101,392, in British Pat. No. 889,050 and in Frech Pat. No. 7,017,514, polyisocyanates obtained by telomerization reactions of the type described, for example, in Belgian Pat. No. 723,640, polyisocyanates containing ester groups of the type described, for example, in British Pat. No. 965,474 and 1,072,956, in U.S. Pat. No. 3,567,763 and in German Pat. No. 1,231,688 and reaction products of the aforementioned isocyanates with acetals as described in German Pat. No. 1,072,385.

It is also possible to use the distillation residues containing isocyanate groups accumulating in the commercial production of isocyanates, optionally in solution in one or more of the aforementioned polyisocyanates. In addition, it is possible to use mixtures of the aforementioned polyisocyanates.

Additional polyisocyanates suitable for use in this invention include those described by W. Siefken in *Justus Liebigs Annalen der Chemie*, 562, 75–136 and in U.S. Pat. No. 3,284,479; U.S. Pat. No. 4,089,835; U.S. Pat. No. 4,093,569; U.S. Pat. No. 4,221,876; U.S. Pat. No. 4,310,448; U.S. Pat. No. 4,359,550 and U.S. Pat. No. 4,495,309.

One class of particularly useful polyisocyanates are the aromatic polyisocyanates such as 2,4- and 2,6-tolylene diisocyanate and mixtures of these isomers ("TDI"), polyphenyl-polymethylene polyisocyanates of the type obtained by condensing aniline with formaldehyde, followed by phosgenation ("crude MDI") and, polyisocyanates containing carbodiimide groups, urethane groups, allophanate groups, isocyanurate groups, urea groups or biuret groups ("modified polyisocyanates").

A preferred class of aromatic polyisocyanates is methylene bis(-4-phenylisocyanate) or MDI. Pure MDI, quasi- and prepolymers of MDI, modified pure MDI, etc. Materials of this type may be used to prepare suitable RIM elastomers. Since pure MDI is a solid, and thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally, uretonimine modified pure MDI is included also. This product is made by heating pure distilled MDI in the presence of a catalyst.

The isocyanate-functional prepolymers of this invention can be made by addition of excess polyisocyanates to the modified poly(alkylene carbonate) polyahls of this invention or by addition of the modified poly(alkylene carbonate) polyols of this invention to excess polyisocyanates. The preparation of isocyanate-functional prepolymers with prior art polyols is well known in the art. Examples can be found in U.S. Pat. No. 4,108,842; U.S. Pat. No. 4,125,522 and U.S. Pat. No. 4,476,292, the relevant portions of which are hereby incorporated by way of reference of their entirety.

In a third aspect, this invention includes novel urethane/urea polymers formed by the reactions of the isocyanate-functional prepolymer compositions based on the novel ester-modified poly(alkylene carbonate) polyahls of this invention with polyahls; many of these polyahls are commonly called chain-extenders when used with isocyanate-functional prepolymers. Optionally, catalysts and a variety of additives can be included.

The chain-extenders useful to make the compositions of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Other chain-extenders including cyclic diols such as 1,4-cyclohexane diol and 1,4-cyclohexanedimethanol; aromatic ring containing diols such as bis hydroxyethylhydroquinone; amide or ester containing diols or amino alcohols are useful. Aromatic diamines and aliphatic diamines are suitable chain-extenders. Examples include ethylenediamines, 1-(2-aminoisopropyl-4-methyl-4-aminocyclohexane), 1,2-propanediamine, 1,4-butane-diamine, 1,6-hexanediamine, diethyltoluenediamine and 1,4-bis-(aminomethyl)cyclohexane. Additional examples of useful chain-extenders can be found in U.S. Pat. No. 4,297,444; U.S. Pat. No. 4,202,957; U.S. Pat. No. 4,476,292; U.S. Pat. No. 4,495,309; and U.S. Pat. No. 4,218,543.

Catalysts such as tertiary amines or an organic tin compound or other polyurethane catalysts may be used. The organic tin compound may be suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 18 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used. Other catalysts include organo zinc, mercury and lead compounds.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethyl ether, etc.), 1,4-dimethylpiperazine, triethylenediamine, etc., and aliphatic polyamines, such as N,N,N'N'-tetramethyl-1,3-butanediamine.

Optional additives include anti-foaming agents such as glycerine, an ethyl acrylate-2-ethylhexyl acrylate copolymer, dimethyl siloxane copolymers and silicones; antioxidants such as ester of β-(3,5-di-tert-butyl-4-hydroxyphenyl) propionic acid with monohydric or polyhydric alcohols, for example, methanol, octadecanol, 1,6-hexanediol, neopentylglycol, thiodiethylene glycol, diethylene glycol, triethylene glycol, pentaerythritol, tris-hydroxyethyl isocyanurate, and dihydroxyethyl oxalic acid diamide; UV absorbers and light stabilizers such as 2-(2'-hydroxyphenyl)benzo-triazoles and sterically hindered amines as bis-(2,2,6,6-tetramethylpiperidyl)-sebacate, bis-(1,2,2,6,6-pentamethylpiperidyl)-sebacate, n-butyl-3,5-di-tert-butyl-4-hydroxybenzyl malonic acid bis-(2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)hexamethylene diamine and 4-tert-octylamino-2,6-dichloro-1,3,5-s-triazine, tris (2,2,6,6-tetramethylpiperidyl)-nitrilotriacetate, tetrakis-(2,2,6,6-tetramethyl-4-piperidyl)-1,2,3,4-butane-tetracarbonic acid and 1,1'(1,2-ethanediyl)-bis-(3,3,5,5-tetramethyl-piperazinone); plasticizers such as phthalates, adipates, glutarates, epoxidized vegetable oils, and the like; fungicides; pigments, dyes; reactive dyes; moisture scavengers; and the like. In addition, fillers and reinforcing materials such as chopped or milled glass fibers, chopped or milled carbon fibers and/or other mineral fibers are useful.

Approximately stoichiometric amounts of the isocyanate moieties of the isocyanate-functional prepolymers of this invention and the active hydrogen moieties on the polyahls are used. The equivalent ratio of isocyanate moieties to total active hydrogen moieties is between about 0.95:1.00 to 1.00:1.05; more preferred is an isocyanate: polyahl equivalent ratio of from 0.97:1.00 to 1.00:1.03; most preferred is a ratio of 1.00:1.00 to 1.00:1.03.

In a fourth aspect, this invention includes novel, urethane/urea polymers formed by the reactions of the ester-modified poly(alkylene carbonate) polyahls of this invention with polyisocyanates, optionally in the presence of the other polyahls. Optionally, catalysts and a variety of additives can be included. Useful polyisocyanates, catalysts and additives are those that have been deefined hereinbefore.

Approximately stoichiometric amounts of the isocyanate moieties on the polyisocyanates and the total active hydrogen moieties on the ester-modified poly(alkylene carbonate) polyahls and other polyahls, if employed, are used. The equivalent ratio of isocyanate moieties to total active hydrogen moieties is between about 0.95:1.00 to 1.00:1.05; more preferred is an isocyanate: active hydrogen equivalent ratio of from 0.97:1.00 to 1.00:1.03; most preferred is a ratio of 1.00:1.00 to 1.00:1.03. The preparation of urethane/urea polymers is well known in the art. Examples of typical reaction conditions employed can be found in U.S. Pat. No. 4,460,715 and U.S. Pat. No. 4,394,491, the relevant portions of which are hereby incorporated by way of reference in their entirety.

The urethane/urea polymers of the present invention can be fabricated by any fabrication technique known in the art. Useful processes include hand casting (see, for example, U.S. Pat. No. 4,476,292) and reaction injection molding (see, for example, U.S. Pat. No. 4,297,444 and U.S. Pat. No. 4,495,309).

Specific Embodiments

The following examples are included for illustrative purposes only, and do not limit the scope of the invention or the claims. Unless otherwise stated, all parts and percentages are by weight.

The molecular weights and distribution are determined by size exclusion chromatography on Waters Ultrastyragel ® 1000 Å and 10,000 Å columns in series using tetrahydrofuran (THF) as the mobile phase and calibrated with narrow molecular weight poly(ethylene glycol) standards.

The Brookfield viscosities are all measured at ambient temperature using an LV4 spindle at the appropriate spin rate.

Distillate samples are analyzed by capillary gas chromatography on a Hewlett-Packard 5840A unit equipped with a J & W Scientific Company DB-1 fused silica capillary column using flame ionization detection.

EXAMPLE 1

Preparation of an Ester-Modified Poly(Ethylene Carbonate)Polyol Containing 53.4 Weight Percent Diethylene Glycol Adipate as Modifier A 10:1 mole ratio of ethylene carbonate to polyester polyol (Formrez ®11-225, a hydroxyl functional diethylene glycol adipate, $\overline{M}n=500$, manufactured by Witco Chemical Corporation) is heated with stirring under a nitrogen atmosphere for 3.5 hours at 175° C. using 0.5 weight percent sodium stannate trihydrate as catalyst to give 97.3 percent ethylene carbonate conversion to a low molecular weight poly(ethylene carbonate)polyol modified with polyester polyol. The product contains 9.7 weight percent carbon dioxide and 45.3 weight percent diethylene glycol adipate. The catalyst is removed as described in U.S. Pat. No. 4,528,364. The product (20 weight percent in acetone) is stirred with anhydrous magnesium silicate (1 g/10 g product) for 3 hours to absorb the catalyst, followed by filtration to remove the catalyst and concentration to remove the acetone.

A portion of the product (93.2 g) and boiling stones (0.2 g) are combined in a 100 ml flask equipped with a thermometer, temperature controlled and a simple take-off head with a water-chilled condenser (about 15° C.) attached to a vacuum source through a dry ice-isopropanol (about −78° C.) trap. The flask is then heated to a maximum pot temperature of 235° C. and a pressure of 10 mm Hg over a period of 3.0 hours.

The distillate collected by the water-chilled condenser accounts for 10.8 weight percent (10.1 g) of the sample charged and has the following assay:
 0.47 percent dioxane,
 12.05 percent ethylene carbonate,
 76.8 percent diethylene glycol, and
 2.85 percent triethylene glycol.

The distillate collected in the dry ice-isopropanol trap accounts for 3.4 weight percent (3.2 g) of the sample charged and has the following assay:
 85.0 percent acetone, and
 10.3 percent dioxane.

The residue is a straw colored, viscous liquid with 11.0 percent carbon dioxide, accounts for 84.8 weight percent (79.0 g) of the sample charged and has the properties described in Table I hereinbelow.

TABLE I

| | Composition and Molecular Weight Data on the Product of Example 1 | | | | | | |
|---|---|---|---|---|---|---|---|
| | Residue (wt %) | Diethylene Glycol Adipate (wt %) | $CO_2$ (wt %) | Molecular Weight | | | |
| | | | | Peak | $\overline{M}n$ | $\overline{M}w$ | PDI |
| Before Advancement | — | 45.3 | 9.7 | 1573 | 1041 | 1841 | 1.77 |
| After Advancement | 84.8 | 53.4 | 11.0 | 3485 | 2098 | 4513 | 2.15 |

Carbon-13 NMR shows that this material contains carbonate, carboxylic acid ester and polyethyleneoxy moieties in its backbone.

This example shows that a poly(ethylene carbonate)polyol formed using diethylene glycol adipate as an initiator can be advanced to an ester-modified poly(ethylene carbonate)polyol containing a high diethylene glycol adipate content (53.4 weight percent) and a high molecular weight ($\overline{M}n$ of 2098). A material containing such high diethylene glycol adipate content would have a much lower molecular weight if prepared by known methods.

EXAMPLE 2

Preparation of an Ester-Modified Poly(Ethylene Carbonate)Polyol Containing 37.5 Weight Percent Poly(Caprolactone)Diol as Modifier The 10:1 mole ratio of ethylene carbonate to polyester polyol(poly(caprolactone)diol, $\overline{M}n=530$) is heated with stirring under a nitrogen atmosphere for 4 hours at 175° C. using 0.5 weight percent sodium stannate trihydrate as catalyst to give 97.9 percent ethylene carbonate conversion to a low molecular weight poly(ethylene carbonate)polyol modified with poly(caprolactone)diol. The product contains 13.2 weight percent carbon dioxide and 30.0 weight poly(caprolactone)diol. The catalyst is removed as in Example 1.

A portion of the product (91.3 g) and boiling stones (0.2 g) are combined in the equipment used in Example 1. The flask is heated to a maximum pot temperature of 235° C. and a pressure of 10 mm Hg over a period of 3.0 hours. The distillate collected by the water-chilled condenser accounts for 13.6 weight percent (12.4 g) of the sample charged and has the following assay:
 0.85 percent dioxane,
 7.27 percent ethylene carbonate,
 51.2 percent diethylene glycol, and
 1.42 percent triethylene glycol.

The distillate collected in the dry ice-isopropanol trap accounts for 5.8 weight percent (5.3 g) of the sample charged and has the following assay:
 89.1 percent acetone, and
 9.3 percent dioxane.

The residue is a straw colored viscous liquid with 15.1 percent carbon dioxide, accounts for 80.0 weight percent (73.0 g) of the sample charged and has the properties described in Table II hereinbelow.

TABLE II

| | Composition and Molecular Weight Data on the Product of Example 2 | | | | | | |
|---|---|---|---|---|---|---|---|
| | Residue (wt %) | Poly(caprolactone) diol (wt %) | $CO_2$ (wt %) | Molecular Weight | | | |
| | | | | Peak | $\overline{M}n$ | $\overline{M}w$ | PDI |
| Before Advancement | — | 30 | 13.2 | 1968 | 1175 | 2213 | 1.88 |
| After Advancement | 80 | 37.5 | 15.1 | 6145 | 3033 | 7015 | 2.31 |

Carbon-13 NMR shows that this material contains carbonate, carboxylic acid ester and polyethyleneoxy moieties in its backbone.

This example shows that a poly(ethylene carbonate)polyol formed using poly(caprolactone)diol as initiator can be advanced to an ester-modified poly(ethylene carbonate)polyol containing a high poly(caprolactone)- diol content (37.5 weight percent) and a high molecular weight ($\overline{M}$ of 3033). A material containing such a high poly(caprolactone)diol content would have a much lower molecular weight if prepared by known methods.

EXAMPLE 3

Preparation of as Ester-Modified Poly(Ethylene Carbonate)Polyol Containing 53.1 Weight Percent Poly(Caprolactone)Diol as Modifier A low molecular weight ($\overline{M}_n$ of 664) poly(ethylene carbonate)polyol (539.9 g; made from a 10.1 molar ratio of ethylene carbonate to diethylene glycol), poly(caprolactone)diol (360.3 g; $\overline{M}_n$ of 530) and boiling stones (0.2 g) are combined in a 1000 ml, 3-necked boiling flask equipped with a thermometer, temperature controller and a down draft water-chilled condenser attached to a vacuum source through a dry ice-isopropanol trap (about $-78°$ C.). The flask is then heated to a pot temperature of 235° C. over a period of 2.5 hours at 10 mm Hg vacuum. The distillate collected in the water-chilled condenser accounts for 75.4 weight percent (679.1 g) of the sample charged and has the following assay:

5.7 percent ethylene carbonate,
 66.7 percent diethylene glycol, and
 10.9 percent triethylene glycol.

The distillate collected at $-78°$ C. accounts for 0.8 weight percent (7.0 g) of the sample charged and has the following assay:

54.5 percent acetone,
 22.6 percent dioxane, and
 15.5 percent water.

The residue is a light yellow, viscous liquid with 14.2 percent carbon dioxide, containing 53.1 weight percent modifier, represents 75.4 weight percent (679.1 g) of the sample charged and has the properties described in Table III hereinbelow.

TABLE III

| | Composition and Molecular Weight Data on the Product of Example 3 | | | | | |
|---|---|---|---|---|---|---|
| | Residue (wt %) | Modifier (wt %) | Molecular Weight | | | |
| | | | Peak | $\overline{M}_n$ | $\overline{M}_w$ | PDI |
| Before Advancement | — | — | 871 | 644 | 1085 | 1.63 |
| After Advancement | 75.4 | 53.1 | 3695 | 2218 | 5091 | 2.30 |

The $\overline{M}_n$ of end group (OH) titration is 2658. Carbon-13 NMR shows that this material contains carbonate, carboxylic acid ester and polyethyleneoxy moieties in its backbone. The poly(caprolactone)diol is chemically incorporated into the polymer backbone.

This example shows that an ester-modified poly(ethylene carbonate)polyol can be formed with a high poly(caprolactone)diol content (53.1 weight percent) and a high molecular weight ($\overline{M}_n$ of 2218). A material containing such a high poly(caprolactone)diol content would have much longer molecular weight if prepared by known methods.

EXAMPLE 4

Preparation of an Ester-Modified Poly(Ethylene Carbonate)Polyol Containing 25.6 Weight Percent Poly(Caprolactone)Diol as Modifier A low molecular weight ($\overline{M}_n$ of 810) poly(ethylene carbonate)polyol (751.9 g; made from ethylene oxide and carbon dioxide), the same poly(caprolactone)diol (199.8 g) used in Example 3 and boiling stones (0.2 g) are combined in the same equipment used in Example 3. The flask is then heated to a pot temperature of 235° C. over a period of 2.5 hours at 10 mm Hg vacuum. The distillate collected in the water-chilled condenser accounts for 16.9 weight percent (161.1 g) of the sample charged and has the following assay:

1.23 percent dioxane,
 2.98 percent ethylene carbonate,
 49.8 percent diethylene glycol,
 23.6 percent triethylene glycol, and
 4.36 percent tetraethylene glycol.

The distillate collected at $-78°$ C. accounts for 0.4 weight percent (3.8 g) of the sample charged and has the following assay:

20.4 percent acetone,
 56.5 percent dioxane, and
 13.8 percent water.

The residue is a light amber, viscous liquid with 23.2 percent carbon dioxide, containing 25.6 weight percent modifier, has a Brookfield viscosity of 19,060 cps at 25° C., represents 82.1 weight percent (781.5 g) of the sample charged and has the properties described in Table IV hereinbelow.

TABLE IV

| | Composition and Molecular Weight Data on the Product of Example 4 | | | | | |
|---|---|---|---|---|---|---|
| | Residue (wt %) | Modifier (wt %) | Molecular Weight | | | |
| | | | Peak | $\overline{M}_n$ | $\overline{M}_n$ | PDI |
| Before Advancement | — | — | 1037 | 810 | 1383 | 1.71 |
| After Advancement | 82.1 | 25.6 | 4790 | 2355 | 5089 | 2.16 |

The $\overline{M}_n$ of end group (OH) titration is 2118. Carbon-13 NMR shows that this material contains carbonate, carboxylic acid ester and polyethyleneoxy moieties in its backbone. The poly(caprolactone)diol is chemically incorporated into the polymer backbone.

This example shows that an ester-modified poly(ethylene carbonate)polyol can be formed with a high poly(caprolactone)diol content (25.6 weight percent) and a high molecular weight ($\overline{M}_n$ of 2355). A material containing such a high poly(caprolactone)diol content would have a much lower molecular weight if prepared by known methods.

EXAMPLE 5

Preparation of an Ester-Modified Poly(Ethylene Carbonate)Polyol Containing 13.0 weight percent Poly(Caprolactone)Diol as Modifier A same low molecular weight poly(ethylene carbonate)polyol (854.8 g) used in Example 4, the same poly(caprolactone)diol (102.1 g) used in Example 3 and boiling stones (0.2 g) are combined in the same equipment used in Example 3. The flask is then heated to a pot temperature of 235° C. over a period of 2.5 hours at 10 mm Hg vacuum. The distillate collected in the water-chilled condenser accounts for 17.1 weight percent (164.0 g) of the sample charged and has the following assay:

0.98 percent dioxane,
 3.60 percent ethylene carbonate,
 49.7 percent diethylene glycol, 25.9 percent triethylene glycol, and 4.80 percent tetraethylene glycol.

The distillate collected at −78° C. accounts for 0.5 weight percent (4.6 g) of the sample charged and has the following assay:

18.5 percent acetone, 67.2 percent dioxane, and 4.9 percent water.

The residue is a light amber, viscous liquid with 24.3 percent carbon dioxide, containing 13.0 weight percent modifier, has a Brookfield viscosity of 26,200 cps, represents 81.7 weight percent (782.1 g) of the sample charged and has the properties described in Table V hereinbelow.

TABLE V

| | Composition and Molecular Weight Data on the Product of Example 5 | | | | | |
|---|---|---|---|---|---|---|
| | Residue (wt %) | Modifier (wt %) | Molecular Weight | | | |
| | | | Peak | $\overline{Mn}$ | $\overline{Mw}$ | PDI |
| Before Advancement | — | — | 1037 | 810 | 1383 | 1.71 |
| After Advancement | 81.7 | 13.0 | 5181 | 2569 | 5584 | 2.17 |

The $\overline{Mn}$ by end group (OH) titration is 2446. Carbon-13 NMR shows that this material contains carbonate, carboxylic acid ester and polyethyleneoxy moieties in its backbone. The poly(caprolactone)diol is chemically bound into the polymer backbone.

EXAMPLE 6

Preparation of an Ester-Modified Poly(Ethylene carbonate)Polyol Containing 48.9 Weight Percent Diethylene Glycol Adipate as Modifier A same low molecular weight poly(ethylene carbonate)polyol (5531.6 g) used in Example 4, Formrez®11-225 (380.2 g) and boiling stones (0.2 g) are combined in the same equipment used in Example 3. The contents of the flask are heated to a pot temperature of 235° C. over a period of 2.5 hours at 10 mm Hg vacuum. The distillate collected in the water-chilled condenser accounts for 16.5 weight percent (153.8 g) of the sample charged and has the following assay:

2.74 percent ethylene carbonate, 59.7 percent diethylene glycol, 23.5 percent triethylene glycol, and 6.43 percent tetraethylene glycol.

The distillate collected at −78° C. accounts for 0.1 weight percent (0.9 g) of the sample charged and has the following assay:

54.2 percent acetone, 10.2 percent dioxane, and 29.6 percent water.

The residue is a light straw colored, viscous liquid with 13.1 percent carbon dioxide, containing 48.9 weight percent modifier, has a Brookfield viscosity of 14,700 cps, represents 83.3 weight percent (778.2 g) of the sample charged and has the properties described in Table VI hereinbelow.

TABLE VI

| | Composition and Molecular Weight Data on the Product of Example 6 | | | | | |
|---|---|---|---|---|---|---|
| | Residue (wt %) | Modifier (wt %) | Molecular Weight | | | |
| | | | Peak | $\overline{Mn}$ | $\overline{Mw}$ | PDI |
| Before Advancement | — | — | 1037 | 810 | 1383 | 1.71 |
| After Advancement | 83.3 | 48.9 | 3700 | 2007 | 4203 | 2.09 |

The $\overline{M}$ by end group (OH) titration is 1765. Carbon-13 NMR shows that this material contains carbonate, carboxylic acid ester and polyethyleneoxy moieties in its backbone. The diethylene glycol adipate is chemically bound into the polymer backbone.

This example shows that a modified poly(ethylene ether carbonate)polyol can be formed with a high diethylene glycol adipate content (48.9 weight percent) and a high molecular weight ($\overline{Mn}$ of 2007). A material containing such a high diethylene glycol adipate content would have a much lower molecular weight if prepared by known methods.

EXAMPLE 7

Preparation of an Ester-Modified Poly(Ethylene Carbonate)Polyol Containing 21.8 Weight Percent Diethylene Glycol Adipate as Modifier The same low molecular weight poly(ethylene carbonate)polyol (769.0 g) used in Example 4, Formrez® 11-225 (181.1 g) and boiling stones (0.2 g) are combined in the same equipment used in Example 3. The contents of the flask are heated to a pot temperature of 228° C. over period of 2.5 hours at 10 mm Hg vacuum. The distillate collected in the water-chilled condenser accounts for 12.2 weight percent (115.9 g) of the sample charged and has the following assay:

0.45 percent dioxane, 5.00 percent ethylene carbonate, 63.6 percent diethylene glycol, 22.3 percent triethylene glycol, and 4.07 percent tetraethylene glycol.

The distillate collected at −78° C. accounts for a 0.2 weight percent (1.3 g) of the sample charged and has the following assay:

56.4 percent acetone, 16.2 percent dioxane, and 18.2 percent water.

The residue is a light yellow, viscous liquid with 17.5 percent carbon dioxide containing 21.8 weight percent modifier, has a Brookfield viscosity of 9170 cps, represents 87.5 weight percent (831.6 g) of the sample charged and has the properties described in Table VII hereinbelow.

TABLE VII

| | Composition and Molecular Weight Data on the Product of Example 7 | | | | | |
|---|---|---|---|---|---|---|
| | Residue (wt %) | Modifier (wt %) | Molecular Weight | | | |
| | | | Peak | $\overline{Mn}$ | $\overline{Mw}$ | PDI |
| Before Advancement | — | — | 1037 | 810 | 1383 | 1.71 |
| After Advancement | 87.5 | 21.8 | 2847 | 1590 | 3189 | 2.01 |

The $\overline{Mn}$ by end (OH) titration is 1455. Carbon-13 NMR shows that this material contains carbonate, carboxylic acid ester and polyethyleneoxy moieties in its backbone. The diethylene glycol adipate is chemically bound into the polymer backbone.

EXAMPLE 8

Preparation of a Series of Succinic Anhydride Modified Poly(Ethylene Carbonate)Polyahls with Increasiang Molecular Weights A low molecular weight ($\overline{Mn}$ of 455) poly(ethylene carbonate)polyol (65.4 g; prepared from diethylene glycol ethylene oxide and $CO_2$), succinic anhydride (15.0 g) and boiling stones (0.2 g) are combined in the same reactor set up as used in Example 1. The reactor is heated at 10 mm Hg vacuum while increasing the reactor temperature. Samples of distillate and the reactor are removed at various times during the reaction to check the distillate composition and the molecular weight advancement of the product. The results are given in Table VIII hereinbelow.

EXAMPLE 9

Preparation of a Series of Adipic Acid Modified Poly(Ethylene Carbonate)Polyahls with Increasing Molecular Weights A sample of the same low molecular weight ($\overline{Mn}$ of 455) poly(ethylene carbonate)polyol used in Example 8 (71.1 g), adipic acid (10.0 g) and boiling stones (0.2 g) are combined using the set up used in Example 1. The reactor is then heated at 10 mm Hg vacuum while increasing the reactor temperature. Samples of the distillate and the reactor are removed at various times during the reaction to check the distillate composition and the molecular weight build of the product. The results are given in Table IX hereinbelow.

TABLE IX

Distillate Composition and Molecular Weight Data for Example 9

| Sample Number | Pot Temp (°C.) | Distillate (wt %) | Molecular Weight Data | | | | Distillate Assay | | | | |
|---|---|---|---|---|---|---|---|---|---|---|---|
| | | | Peak | $\overline{Mn}$ | $\overline{Mw}$ | PDI | MEG | EC | DEG | TriEG | Tetra EG |
| 1 | 100 | — | 225 | 390 | 618 | 1.58 | — | — | — | — | — |
| 2 | 170 | 5.6 | 544 | 428 | 638 | 1.49 | 0.95 | 19.2 | 76.2 | 3.22 | 0 |
| 3 | 197 | 8.3 | 673 | 506 | 773 | 1.53 | 0 | 4.0 | 83.5 | 12.2 | 0 |
| 4 | 221 | 10.7 | 873 | 621 | 1013 | 1.63 | 0 | 0.9 | 48.6 | 47.3 | 1.21 |
| 5 | 228 | 12.1 | 1137 | 784 | 1349 | 1.72 | 0 | 0.7 | 44.9 | 48.3 | 2.55 |
| 6 | 250 | 13.3 | 1398 | 888 | 1600 | 1.80 | 0 | 0.9 | 48.7 | 42.8 | 3.09 |
| 7 | 262 | 16.0 | 2119 | 1183 | 2315 | 1.96 | 0 | 0.9 | 53.8 | 34.2 | 4.79 |

The distillate collected at −78° C. accounts for 5.0 weight percent (4.1 g) of the sample charged and has

TABLE VIII

Distillate Composition and Molecular Weight Data for Example 8

| Sample Number | Pot Temp (°C.) | Distillate (wt %) | Molecular Weight Data | | | | Distillate Assay[2] | | | |
|---|---|---|---|---|---|---|---|---|---|---|
| | | | Peak | $\overline{Mn}$ | $\overline{Mw}$ | PDI | MEG | EC | DEG | TriEG |
| Starting Material | — | — | 565 | 455 | 673 | 1.48 | — | — | — | — |
| 1 | 90 | — | 565 | 455 | 657 | 1.48 | — | — | — | — |
| 2 | 165 | — | 635 | 513 | 751 | 1.46 | — | — | — | — |
| 3 | 169 | — | 714 | 568 | 863 | 1.52 | — | — | — | — |
| 4 | 200 | 2.2 | 1026 | 733 | 1222 | 1.67 | 0.37 | 47.9 | 48.3 | 1.57 |
| 5 | 230 | 3.2 | 1794 | 1058 | 2001 | 1.89 | 0.46 | 13.9 | 77.5 | 3.11 |
| 6 | 242 | 4.9 | 2303 | 1329 | 2671 | 2.01 | 0 | 5.70 | 78.6 | 8.37 |
| 7 | 251 | 5.4 | 3273 | 1583 | 3391 | 2.14 | 0 | 2.94 | 78.4 | 8.20 |
| 8 | 264 | 6.5 | 3701 | 1843 | 4086 | 2.22 | 0 | 2.66 | 73.2 | 13.2 |

[1]Amount of material in condenser, normalized to total reactants charged to the reactor.
[2]Compounds analyzed by capillary gas chromatography on a Hewlett-Packard 5840A unit equipped with a J & W Scientific Company DB-1 fused silica capillary column, flame ionization detection. MEG-monoethylene glycol, EC-ethylene carbonate, DEG-diethylene glycol,TriEG-triethylene glycol.

The distillate collected at −78° C. accounts for 5.0 weight percent (4.0 g) of the sample charged and has the following assay:
  32.7 percent acetone,
  2.00 percent dioxane, and
  61.8 percent water.

The residue is a straw colored, viscous liquid having an acid content of 0.60 meq/g, a Brookfield viscosity of 54,200 cps at 25° C. and represents 82.7 weight percent (66.5 g) of the sample charged. Molecular weight studies show that there is no unreacted succinic anhydride in the product. Carbon-13 NMR shows that the product contains both carbonate ester (155.9 ppm) and succinate ester (173.0 ppm).

the following assay:
  37.2 percent acetone,
  3.84 percent dioxane, and
  51.1 percent water.

The residue is a straw colored, viscous liquid having an acid content of 0.121 meq/g (95.0 weight percent acid conversion), a Brookfield viscosity of 9700 cps at 25° C. and represents 74.3 weight percent (60.7 g) of the sample charged. Carbon-13 NMR shows that the product contains both carbonate ester (155.7 ppm) and adipate ester (173.4 ppm).

This example shows that a series of ester-modified poly(ethylene carbonate)polyols can be formed with high ester contents and high molecular weights by using a dicarboxylic acid as modifier.

EXAMPLE 10

Preparation of a Series of Adipic Acid Modified Poly(Ethylene Carbonate)polyahls with Increasing Molecular Weights A sample of a low molecular weight ($\overline{M}n$ of 455) poly(ethylene carbonate)polyol (72.7 g), dimethyl adipate (14.0 g) and boiling stones (0.2 g) are combined using the set up used in Example 1. The reactor is then heated at 50 mm Hg vacuum for 1.0 hour at total reflux, during which time the pot temperature increases from 144° C. to 200° C. This is necessary since dimethyl adipate (boiling point=109°-110° C. at 14 mm Hg) is more volatile than diethylene glycol. The vacuum is then slowly adjusted to 10 mm Hg. Samples of the distillate and the reactor are removed at various times during the reaction to check the distillate composition and the molecular weight advancement of the product. The results are given in Table X hereinbelow.

weights using dicarboxylic acids as modifiers and prepared by known methods.

EXAMPLE 11

Preparation of a Series of Terephthalic Acid Modified Poly(Ethylene Carbonate) Polyahls with Increasing Molecular Weights A sample of a low molecular weight ($\overline{M}n$ of 455) poly(ethylene carbonate) polyol (70.5 g), dimethyl terephthalate (10.0 g) and boiling stones (0.2 g) are combined in the same reactor set up as used in Example 1. The reactor is then heated at 10 mm Hg vacuum while increasing the reactor temperature. Samples of the distillate and the reactor are removed at various times during the reaction to check the distillate composition and the molecular weight advancement of the product. The results are given in Table XI hereinbelow.

TABLE XI

| | | | Distillate Composition and Molecular Weight Data for Example 11 | | | | | | | | |
|---|---|---|---|---|---|---|---|---|---|---|---|
| Sample Number | Pot Temp (°C.) | Distillate (wt %) | Molecular Weight Data | | | | Distillate Assay | | | | |
| | | | Peak | $\overline{M}n$ | $\overline{M}w$ | PDI | Dioxane | EC | DEG | TriEG | Terephthalate |
| 1 | 140 | 0 | 565 | 441 | 654 | 1.47 | — | — | — | — | — |
| 2 | 163 | 0 | 1048 | 720 | 1212 | 1.68 | — | — | — | — | — |
| 3 | 177 | 8.0 | 1369 | 874 | 1563 | 1.79 | 0 | 8.45 | 73.6 | 6.30 | 9.60 |
| 4 | 195 | 12.8 | 1991 | 1180 | 2288 | 1.94 | 0 | 3.62 | 77.6 | 9.11 | 7.51 |
| 5 | 220 | 16.5 | 3481 | 1738 | 3711 | 2.14 | 0.56 | 1.01 | 84.8 | 8.12 | 2.75 |
| 6 | 235 | 18.4 | 5107 | 2308 | 5185 | 2.25 | 1.76 | 0.71 | 79.9 | 10.5 | 0.95 |
| 7 | 248 | 20.4 | 7242 | 3130 | 7451 | 2.38 | 4.47 | 1.05 | 67.9 | 9.90 | 1.14 |
| 8 | 260 | 22.0 | 8886 | 3778 | 9259 | 2.45 | 7.53 | 1.45 | 47.9 | 11.4 | 1.57 |

The distillate collected at −78° C. accounts for 7.2 weight percent (5.8 g) of the sample charged and has the following assay:
35.4 percent acetone,

TABLE X

| | | | | Distillate Composition and Molecular Weight Data for Example 10 | | | | | | | | | |
|---|---|---|---|---|---|---|---|---|---|---|---|---|---|
| Sample Number | Temp (°C.) | Vacuum (mmHg) | Distillate (wt %) | Molecular Weight Data | | | | Distillate Assay | | | | | |
| | | | | Peak | $\overline{M}n$ | $\overline{M}w$ | PDI | MEG | Dioxane | EC | DEG | TriEG | Tetra EG | Dimethyl Adipate |
| 1 | 157 | 50 | 0 | 587 | 521 | 735 | 1.41 | — | — | — | — | — | — | — |
| 2 | 200 | 50 | 0 | 1048 | 762 | 1252 | 1.62 | — | — | — | — | — | — | — |
| 3 | 195 | 14 | 4.8 | 1616 | 990 | 1814 | 1.83 | 0.65 | 1.00 | 10.6 | 75.3 | 8.82 | — | 1.53 |
| 4 | 200 | 10 | 8.5 | 2209 | 1261 | 2442 | 1.94 | 0 | 0 | 1.34 | 82.3 | 12.8 | 0.30 | 0.53 |
| 5 | 217 | 10 | 10.6 | 2776 | 1546 | 3156 | 2.04 | 0 | 0 | 0.26 | 86.5 | 8.2 | 0 | 0.29 |
| 6 | 230 | 10 | 12.2 | 3553 | 1855 | 4004 | 2.16 | 0 | 0.46 | 0.57 | 78.9 | 10.3 | 0 | 0.90 |
| 7 | 240 | 10 | 13.2 | 4183 | 1874 | 4241 | 2.26 | 0 | 0.46 | 1.02 | 78.2 | 9.4 | 0.28 | 0.60 |
| 8 | 250 | 10 | 14.4 | 4623 | 2338 | 5331 | 2.28 | 0 | 0.75 | 0.88 | 70.5 | 12.6 | 0.39 | 0.34 |

The distillate collected at −78° C. accounts for 8.5 weight percent (7.4 g) of the sample charged and has the following assay:
31.8 percent acetone,
44.5 percent methanol,
3.65 percent dioxane, and
4.7 percent water.

The residue is a straw colored, viscous liquid having a Brookfield viscosity of 58,800 cps at 24° C. and represents 70.5 weight percent (61.1 g) of the sample charged. Carbon-13 NMR shows that the product contains both carbonate ester (155.7 ppm) and adipate ester (173.4 ppm) and no dimethyl adipate.

This example shows that a series of ester-modified poly(ethylene carbonate) polyols can be formed with high ester contents and high molecular weights by using dimethyl adipate as modifier. Materials containing these ester contents would have much lower molecular 30.3 percent methanol,
15.5 percent dioxane, and
6.3 percent water.

The residue is a light amber, viscous liquid having a Brookfield viscosity of 875,000 cps at 25° C. and represents 62.0 weight percent (49.9 g) of the sample charged. Carbon-13 NMR shows that the product contains both carbonate ester (155.3 ppm) and terephthalate ester (165.5 ppm) and no dimethyl terephthalate.

EXAMPLE 12

Preparation of an Ester-modified Poly(Ethylene Carbonate) Polyol Containing 38.3 Weight Percent 1,4-Cyclohexane Dimethanol Dodecandioate as Modifier A high molecular weight ($\overline{M}n$ of 2942) poly(ethylene carbonate) polyol (16.02 g, 0.099 mol carbonate), K-Flex 188-50 (9.94 g, 0.045 mol OH, a polyester polyol made from 1,4-cyclohexane dimethanol and n-dodecandioic acid, manufactured by King Industries) and sodium stannate trihydrate (0.5 weight percent) are combined in a 50 ml flask equipped with thermometer, overhead stirrrer, condenser, temperature controller and maintained under a nitrogen atmosphere. The contents of the flask are heated 175° C. Samples are analyzed by size exclusion chromatography at various times. The results are given in Table XII hereinbelow.

TABLE XII

Results From Example 12

| Sample Number | Conditions | Molecular Weight | | | |
|---|---|---|---|---|---|
| | | Peak | Mn | Mw | PDI |
| — | Starting Poly(Ethylene Carbonate) Polyol | 5132 | 2942 | 4492 | 1.52 |
| — | Starting Polyester Polyol | 360 | 464 | 592 | 1.27 |
| 1 | Heated to 110° C. | 394 | 716 | 2273 | 3.17 |
| 2 | Heated to 175° C. | 1502 | 797 | 1746 | 2.19 |
| 3 | 15 Min at 175° C. | 1791 | 787 | 1811 | 2.30 |
| 4 | 30 Min at 175° C. | 1641 | 745 | 1706 | 2.28 |
| 5 | 75 Min at 175° C. | 1640 | 847 | 1750 | 2.06 |

Tranesterification is complete within 15 minutes. The product is a single phase, liquid material containing very little free K-Flex 188-50. The majority of the polyester polyol has been chemically incorporated into the backbone of the polymer.

EXAMPLE 13

Preparation of an Isocyanate-Functional Prepolymer

The poly(ethylene carbonate) polyol modified with 53.1 weight percent poly(caprolactone) diol prepared in Example 3 (73.83 g) is placed in a 100 ml resin pot equipped with thermometer, overhead stirrer, temperature controlled at 80° C. by an oil bath and maintained under a nitrogen atmosphere. One drop (about 15 mg) of benzoyl chloride is added as prepolymer stabilizer. The reactor is then equilibrated at 80° C. and the benzoyl chloride dissolved into the polyol by thorough agitation. Freshly distilled 4,4'-methylene di(phenyl isocyanate) (MDI, 47.1 g, Isonate ® 125M, manufactured by The Dow Chemical Company) is added by syringe to the reactor under nitrogen cover. The contents of the reactor is stirred at 80° C. for one hour.

The prepolymer is then analyzed for isocyanate content (ASTM D-0168-74). A sample (1.4804 g) is dissolved in dry dimethylformamide (25 ml), treated with an excess of a standard di-n-butylamine solution in dry toluene (0.2N, 25 ml) for about 15 minutes at ambient temperature with stirring and the excess amine titrated using 0.1N HCl. The weight percent isocyanate is 9.97.

This example illustrates the preparation of a novel prepolymer composition in which all of the hydroxyl moieties on an ester-modified poly(alkylene carbonate) polyol are converted to urethane moieties by reaction with excess MDI. The NCO-functional prepolymer has an isocyanate content of 9.97 weight percent.

EXAMPLE 14

Preparation of a Urethane Elastomer

The isocyanate-functional prepolymer of Example 13 (104.00 g) is thoroughly degassed under vacuum and quickly poured into a 150 ml plastic cup. One drop (about 15 mg) of a catalyst solution is added 10.0 weight percent of dibutyltin dilaurate in a 2000 molecular weight poly(propylene glycol). 1,4-Butanediol (10.58 g, distilled from CaH₂) which had been thoroughly degassed under vacuum is added quickly to give a 1.05 index (equivalent ratio of isocyanate to hydroxyl is 1.05:1). The mixture is stirred rapidly for 43 seconds and then poured into a preheated mold (6.0"×6.0"×0.125"). The sample is cured at 121° C. (250° F.) for one hour. An elastomer polyurethane plaque is obtained upon demolding which has the physical properties described in Table XIII hereinbelow.

TABLE XIII

Physical Properties of the Urethane Elastomer of Example 14 (42.0 Weight Percent Hard Segment)

| Property | Value | Test Procedure |
|---|---|---|
| Mn | 135,400 | a |
| Mw | 290,000 | a |
| PDI | 2.14 | a |
| Density | 1.23 g/cc | — |
| Hardness (Shore A) | 99 | ASTM E-140 |
| Hardness (Shore D) | 53 | ASTM E-140 |
| Flexual Modulus | 16,160 | ASTM D-790 |
| Young's Modulus | 13,100 | ASTM D-638 |
| 100% Modulus | 1610 | ASTM D-638 |
| Tensile at Break | 2710 | ASTM D-638 |
| % Elongation at Break | 550% | ASTM D-638 |
| Notched Izod | No break | ASTM D-256 | a Determined by Size Exclusion Chromatography on Waters Ultrastyragel 10³Å, 10⁴Å and 10⁵Å columns arranged in series using dimethyl formamide as the mobile phase and calibrated with polystyrene standards using a refractive index detector

EXAMPLES 15–18

Additional Prepolymers and Elastomers

A series of additional isocyanate-functional prepolymers and their corresponding urethane elastomers are prepared by procedures similar to those of Examples 13 and 14. A summary of these materials is given in Table XIV hereinbelow.

TABLE XIV

Materials Prepared in Examples 13 Through 18

| Example Number | Product of Example Number | Modifier | Modifier (wt %) | Molecular Weight of Modified Polyol | NCO in Prepolymer (wt %) |
|---|---|---|---|---|---|
| 13, 14 | 3 | poly(caprolactone) diol | 53.1 | 2218 | 9.97 |
| 15 | 4 | poly(caprolactone) diol | 25.6 | 2355 | 9.84 |
| 16 | 5 | poly(caprolactone) diol | 13.0 | 2569 | 10.06 |
| 17 | 6 | diethylene glycol adipate | 48.9 | 2007 | 9.73 |
| 18 | 7 | diethylene glycol adipate | 21.8 | 1590 | 9.77 |

What is claimed is:

1. An isocyanate-functional pre-polymer composition comprising the reaction product of at least one ester-modified poly(alkylene carbonate) polyahl and at least one organic polyisocyanate; the proportion of said ester-modified poly(alkylene carbonate) polyahl to said polyisocyanate being such that all polyahl moieties are reacted with isocyanate moieties and isocyanate moieties are present in excess, said ester modified poly(alkylene carbonate) polyahl comprising
    (a) a backbone comprising
        (1) the residue of at least one polyahl initiator;
        (2) a plurality of poly(alkyleneoxy) moieties; and
        (3) a plurality of poly(alkylene carbonate) moieties;
    (b) a plurality of active hydrogen end groups; and (c) the residue of at least one modifier which resides in the polymer backbone or is present as an end group; wherein the ester modifier is selected from the group consisting of
(1) polyester polyahls;
(2) polyacids;
(3) acid esters of polyacids and $C_{1-8}$ monofunctional alcohols; and
(4) cyclic acid anhydrides; said ester-modified poly(alkylene carbonate) polyahls having a number average molecular weight higher than the number average molecular weight of any known poly(alkylene carbonate) polyahl comprising the same monomeric components.

2. The isocyanate-functional prepolymer composition of claim 1, having a weight percent isocyanate of 3 percent or greater.

3. The isocyanate-functional prepolymer composition of claim 1, wherein the ester-modified poly(alkylene carbonate) polyahl is an ester-modified poly(alkylene carbonate) polyol.

4. The isocyanate-functional prepolymer composition of claim 1 wherein said organic polyisocyanate is selected from the group consisting of aromatic, aliphatic, alkyl aromatic, aryl aliphatic and cycloaliphatic polyisocyanates.

5. The isocyanate-functional prepolymer composition of claim 4 wherein said polyisocyanate is toluene diisocyanate, methylene bis(4-phenylisocyanate) or their isomers or oligomers.

6. The isocyanate-functional prepolymer composition of claim 1, wherein the modified poly(alkylene carbonate) polyahl is a random polymer corresponding to the formula

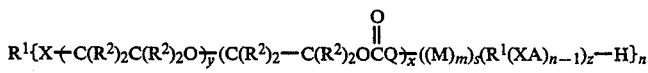

wherein
R$^1$ is separately in each occurrence an n-valent hydrocarbon radical or hydrocarbon radical which can contain one or more heteroatoms of O, N, or Si;
R$^2$ is separately in each occurrence hydrogen, halogen, a nitro group, a cyano group, a $C_{1-20}$ hydrocarbyl group or a $C_{1-20}$ hydrocarbyl group substituted with one or more halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;
M is separately in each occurrence the residue of a polyester polyahl or the residue of a polycarboxylic acid;
m is separately in each occurrence an integer from 1 to 40 when M is the residue of a polyester polyahl and m is 1 when M is the residue of a polycarboxylic acid;
X is separately in each occurrence S, O, NH

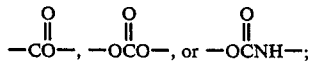

A is separately in each occurrence

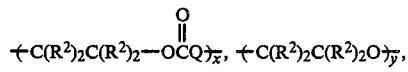

combinations thereof or a covalent bond;
Q is separately in each occurrence O, S or NH provided that all carbonate moieties are internal because terminal carbonate moieties are unstable and form OH moieties by the elimination of $CO_2$;
n is separately in each occurrence an integer of from 1 to 25;
s is separately in each occurrence an integer of from 1 to 10;
x is separately in each occurrence an integer of from 1 to 40;
y is separately in each occurrence an integer of from 1 to 120; and
z is separately in each occurrence an integer of from 0 to 5.

7. The isocyanate-functional prepolymer composition of claim 2, wherein the modified poly(alkylene carbonate) polyahl is a random polymer corresponding to the formula

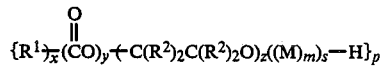

wherein
R$^1$ is R$^3$—X$^1_n$;
R$^2$ is separately in each occurrence hydrogen, halogen, a nitro group, a cyano group, a $C_{1-20}$ hydrocarbyl group or a $C_{1-20}$ hydrocarbyl group substituted with one or more halogen, cyano, nitro, thioalkyl, tert-amino, alkoxy, aryloxy, aralkoxy, carbonyldioxyalkyl, carbonyldioxyaryl, carbonyldioxaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;
R$^3$ is separately in each occurrence an n-valent hydrocarbon radical or hydrocarbon radical which contains one or more heteroatoms of O, N or S;
X$^1$ is O, S or NH;
M is separately in each occurrence the residue of a polyester polyol or the residue of a polycarboxylic acid;
m is separately in each occurrence an integer of from 1 to 40 when M is the residue of a polyester polyol and m is 1 when M is the residue of a polycarboxylic acid;
n is separately in each occurrence in integer of from 1 to 25;
p is an integer of 1 or greater;
s is separately in each occurrence an integer of 1 to 10;
x is 1;
y is separately in each occurrence 1 to 40; and z is separately in each occurrence 1 to 100 and wherein the active hydrogen end groups are hydroxyl groups.

8. The isocyanate-functional prepolymer composition of claim 7 wherein
  $R^2$ is hydrogen, methyl or ethyl;
  $R^3$ is an n-valent $C_{1-10}$ alkane containing oxygen moieties;
  $X^1$ is S, O or NH;
  M is separately in each occurrence the residue of a polyester polyol;
  m is an integer from 1 to 10, inclusive
  n is 1 or 2, inclusive
  p is 1 to 5, inclusive;
  y is 5 to 20, inclusive
  z is 20 to 50, inclusive; and
  s is an integer from 1 to 5, inclusive.

9. The isocyanate-functional prepolymer composition of claim 1, prepared by contacting at least one modified poly(alkylene carbonate) polyahl with the organic polyisocyanate under conditions of temperature, pressure, stoichiometry and mixing such that all of the polyahl moieties on the modified poly(alkylene carbonate) polyahl are reacted with the polyisocyanate and that the polyisocyanate is present in excess.

10. A urethane/urea polymer, comprising
  the residue of at least one isocyanate-functional prepolymer composition of claim 1; and
  the residue of at least one polyahl selected from the group consisting of aromatic, aliphatic, arylaliphatic, alkylaromatic and cycloaliphatic polyamines, polymercaptans and polyfunctional hydroxyl compounds.

11. The urethane/urea polymer of claim 10, wherein said polyfunctional hydroxyl compound is an aliphatic diol selected from the group consisting of monoethylene glycol, diethylene glycol, 1,4-butanediol, monopropylene glycol and dipropylene glycol.

12. The urethane/urea polymer of claim 11, wherein said polyfunctional hydroxyl compound is a cyclic aliphatic diol selected from the group consisting of cyclohexane diol and cyclohexane dimethylol.

13. The urethane/urea polymer of claim 10 wherein said aromatic polyamine is an aromatic diamine.

14. The urethane/urea polymer of claim 13 wherein the aromatic diamine is diethyltoluenediamine.

15. The urethane/urea polymer of claim 10 formed by reacting approximately stoichiometric amounts of the isocyanate moieties of said isocyanate-functional prepolymer composition with the active hydrogen moieties of said polyahl.

16. The urethane/urea polymer of claim 15 wherein the equivalent ratio of isocyanate moieties:active hydrogen moieties is between 0.95:1.00 and 1.05:1.00.

17. The urethane/urea polymer of claim 10 in the form of an elastomer, a film, or a foam.

18. A urethane/urea polymer, comprising the residue of one or more of an ester-modified poly(alkylene carbonate) polyahl; and one or more organic polyisocyanates, said ester-modified poly(alkylene carbonate) polyahl comprising
  (a) a backbone comprising
    (1) the residue of at least one polyahl initiator;
    (2) a plurality of poly(alkyleneoxy) moieties; and
    (3) a plurality of poly(alkylene carbonate) moieties;
  (b) a plurality of active hydrogen end groups; and
  (c) the residue of at least one modifier which resides in the polymer backbone or is present as an end group; wherein the ester modifier is selected from the group consisting of
    (1) polyester polyahls;
    (2) polyacids;
    (3) acid esters of polyacids and $C_{1-8}$ monofunctional alcohols; and
    (4) cyclic acid anhydrides; said ester-modified poly(alkylene carbonate) polyahls having a number average molecular weight higher than the number average molecular weight of any known poly(alkylene carbonate) polyahl comprising the same monomeric components.

19. The urethane/urea polymer of claim 18 which in addition includes one or more other polyahls.

20. The urethane/urea polymer of claim 18 or 19 wherein the modified poly(alkylene carbonate) polyahl is a random polymer corresponding to the formula

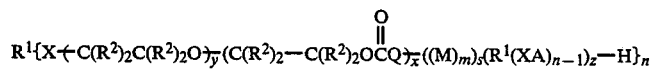

wherein
  $R^1$ is separately in each occurrence an n-valent hydrocarbon radical or hydrocarbon radical which can contain one or more heteroatoms of O, N, or S;
  $R^2$ is separately in each occurrence hydrogen, halogen, a nitro group, a cyano group, a $C_{1-20}$ hydrocarbyl group or a $C_{1-20}$ hydrocarbyl group substituted with one or more halo, cyano, nitro, thialkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;
  M is separately in each occurrence the residue of a polyester polyahl or the residue of a polycarboxylic acid;
  m is separately in each occurrence an integer from 1 to 40 when M is the residue of a polyester polyahl and m is 1 when M is the residuee of a polycarboxylic acid;
  X is separately in each occurrence S, O, NH $$-\overset{O}{\underset{\|}{C}}O-,\ -O\overset{O}{\underset{\|}{C}}O-,\ \text{or}\ -O\overset{O}{\underset{\|}{C}}NH-;$$

A is separately in each occurrence

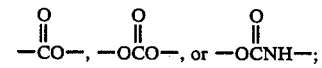

combinations thereof or a covalent bond;
  Q is separately in each occurrence O, S or NH provided that all carbonate moieties are internal because terminal carbonate moieties are unstable and form OH moieties by the elimination of $CO_2$;
  n is separately in each occurrence an integer of from 1 to 25;

s is separately in each occurrence an integer of from 1 to 10;

x is separately in each occurrence an integer of from 1 to 40;

y is separately in each occurrence an integer of from 1 to 120; and z is separately in each occurrence an integer of from 0 to 5.

21. The urethane/urea polymer of claim 18 or 19 wherein the modified poly(alkylene carbonate) polyahl is a random polymer corresponding to the formula

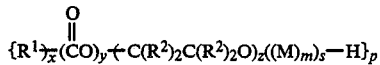

wherein $R^1$ is $R^3\text{-}X^1{}_n$;

$R^2$ is separately in each occurrence hydrogen, halogen, a nitro group, a cyano group, a $C_{1-20}$ hydrocarbyl group or a $C_{1-20}$ hydrocarbyl group substituted with one or more halogen, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

$R^3$ is separately in each occurrence an n-valent hydrocarbon radical or hydrocarbon radical which contains one or more heteroatoms of O, N or Si;

$X^1$ is O, S or NH;

M is separately in each occurrence the residue of a polyester polyol or the residue of a polycarboxylic acid;

m is separately in each occurrence an integer of from 1 to 40 when M is the residue of a polyester polyol and m is 1 when M is the residue of a polycarboxylic acid;

n is separately in each occurrence an integer of from 1 to 25;

p is an integer of 1 or greater;

s is separately in each occurrence an integer of 1 to 10;

x is 1;

y is separately in each occurrence 1 to 40; and z is separately in each occurrence 1 to 100 and wherein the active hydrogen end groups are hydroxyl groups.

22. The urethane/urea polymer of claim 18 or 19 wherein said organic polyisocyanate is selected from the group consisting of aromatic, aliphatic, alkylaromatic, arylaliphatic and cycloaliphatic polyisocyanates.

23. The uretane/urea polymer of claim 22 wherein said aromatic polyisocyanate is toluene diisocyanate, methylene bis(4-phenylisocyanate) or their isomers or oligomers.

24. The urethane/urea polymer of claim 19 wherein said other polyahls are selected from the group consisting of aromatic, aliphatic, alkylaromatic, arylaliphatic and cycloaliphatic polyamines, polymercaptans and polyfunctional hydroxyl compounds.

25. The urethane/urea polymer of claim 24 wherein said other aliphatic polyfunctional hydroxyl compound is selected from the group consisting of monoethylene glycol, diethylene glycol, 1,4-butanediol, monopropylene glycol and dipropylene glycol.

26. The urethane/urea polymer of claim 24 wherein said other cycloaliphatic polyfunctional hydroxyl compound is selected from the group consisting of cyclohexanediol and cyclohexanedimethylol.

27. The urethane/urea polymer of claim 24 wherein said other aromatic polyamine is an aromatic diamine.

28. The urethane/urea polymer of claim 27 wherein the aromatic diamine is diethyltoluene diamine.

29. The urethane/urea polymer of claim 18 or 19 formed by reacting approximately stoichiometric amounts of the isocyanate moieties of said organic polyisocyanates with the active hydrogen moieties of said polyahls.

30. The urethane/urea polymer of claim 29 where the equivalent ratio of isocyanate moieties:toal active hydrogen moieties is between 0.95:1.00 and 1.05:1.00.

31. The urethane/urea polymer of claim 18 or 19 in the form of an elastomer, a film, or a foam.

* * * * *